(12) United States Patent
Ostler

(10) Patent No.: US 12,507,682 B2
(45) Date of Patent: Dec. 30, 2025

(54) FISHING CANE

(71) Applicant: Travis Ostler, Grace, ID (US)

(72) Inventor: Travis Ostler, Grace, ID (US)

( * ) Notice: Subject to any disclaimer, the term of this patent is extended or adjusted under 35 U.S.C. 154(b) by 0 days.

(21) Appl. No.: 18/661,433

(22) Filed: May 10, 2024

(65) Prior Publication Data
US 2025/0344683 A1 Nov. 13, 2025

(51) Int. Cl.
| | | |
|---|---|---|
| *A01K 87/02* | (2006.01) | |
| *A01K 87/00* | (2006.01) | |
| *A01K 87/04* | (2006.01) | |
| *A45B 9/00* | (2006.01) | |

(52) U.S. Cl.
CPC .......... *A01K 87/025* (2013.01); *A01K 87/007* (2013.01); *A01K 87/04* (2013.01); *A45B 9/00* (2013.01); *A45B 2009/002* (2013.01)

(58) Field of Classification Search
CPC ............................. A01K 87/025; A01K 87/007
See application file for complete search history.

(56) References Cited

U.S. PATENT DOCUMENTS

| | | | | |
|---|---|---|---|---|
| 475,852 | A * | 5/1892 | Edgerly | A45B 3/00 43/18.1 R |
| 1,336,088 | A * | 4/1920 | Poremba | A01K 87/025 43/18.1 CT |
| 1,406,268 | A * | 2/1922 | Madej | A45B 3/00 43/18.1 CT |
| 1,442,813 | A * | 1/1923 | Lobit | A01K 87/025 43/18.1 CT |
| 1,972,518 | A * | 9/1934 | Grandjean | A45B 3/00 43/18.1 CT |
| 2,723,482 | A * | 11/1955 | Marten | A01K 97/08 206/315.11 |
| 7,210,264 | B1 * | 5/2007 | Demetris | A01K 97/24 43/25 |
| 9,277,794 | B2 * | 3/2016 | Moreau | A45B 9/00 |
| D1,052,266 | S * | 11/2024 | Herrera | D3/260 |
| 2007/0204895 | A1 * | 9/2007 | Govero | A01K 87/00 43/22 |
| 2012/0227309 | A1 * | 9/2012 | Fanelli | A01K 97/08 43/26 |
| 2015/0335000 | A1 * | 11/2015 | Rudebeck | A01K 87/007 29/434 |
| 2016/0338334 | A1 * | 11/2016 | Paczesny | A01K 97/01 |
| 2017/0055508 | A1 * | 3/2017 | Shiflett, Jr. | A01K 87/007 |
| 2025/0000221 | A1 * | 1/2025 | Overly | A45B 9/02 |

* cited by examiner

*Primary Examiner* — Richard G Davis
(74) *Attorney, Agent, or Firm* — Lyman Moulton Esq.; Moulton Patents, PLLC

(57) ABSTRACT

The disclosed fishing cane includes a telescoping cane with a rubber foot bottom and a top and fishing line eyelets there between. The disclosure also includes a fishing reel attached proximal to the top of the telescoping cane and a fishing pole extension slidingly embedded in the telescoping cane and comprising fishing line eyelets and a stop boss.

14 Claims, 4 Drawing Sheets

FISHING CANE

SUMMARY OF THE INVENTION

The disclosed fishing cane includes a telescoping cane with a rubber foot bottom and a top and fishing line eyelets there between. The disclosure also includes a fishing reel attached proximal to the top of the telescoping cane and a fishing pole extension slidingly embedded in the telescoping cane and comprising fishing line eyelets and a stop boss.

Figure 1:
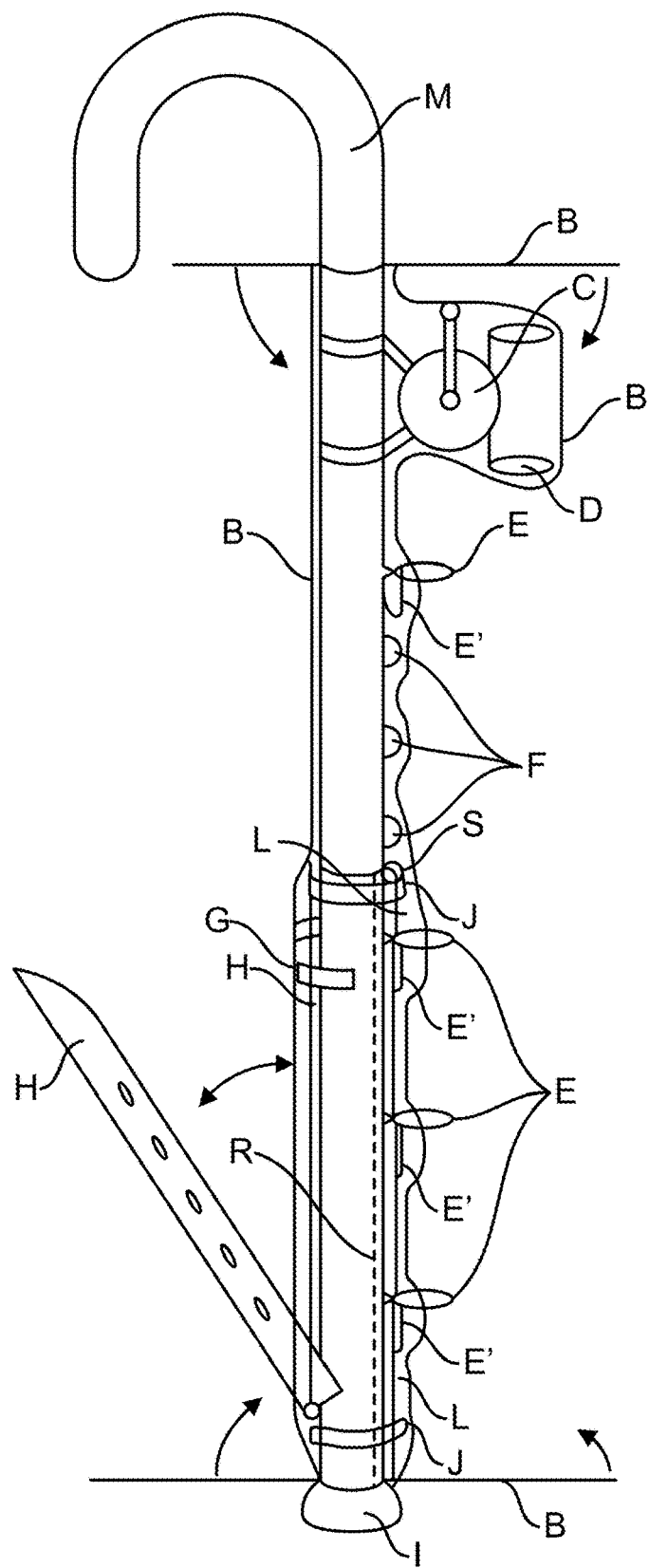
FIG. 1 is a side perspective view of the fishing cane in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a side perspective view of the fishing cane in accordance with an embodiment of the present disclosure. The view shows the fishing cane A of the fishing cane, the protective cover B, the fishing reel C, the hook holder D, the fishing line eyelets E, the telescoping adjustment knobs F, locking strap G to hold the arm/leg H, the rubber foot or boot I, the hook and loop wrap J, the pivoting barrel K, the fishing tip extension L, the handle crook M, the longitudinal key hole R, the boss stop S and the bipod legs X. The leg or arm H is shown extended from the fishing cane A but stores folded up against the fishing cane A. Likewise, the bipod legs X are shown extended but store folded up against the fishing cane A.

Figure 2:
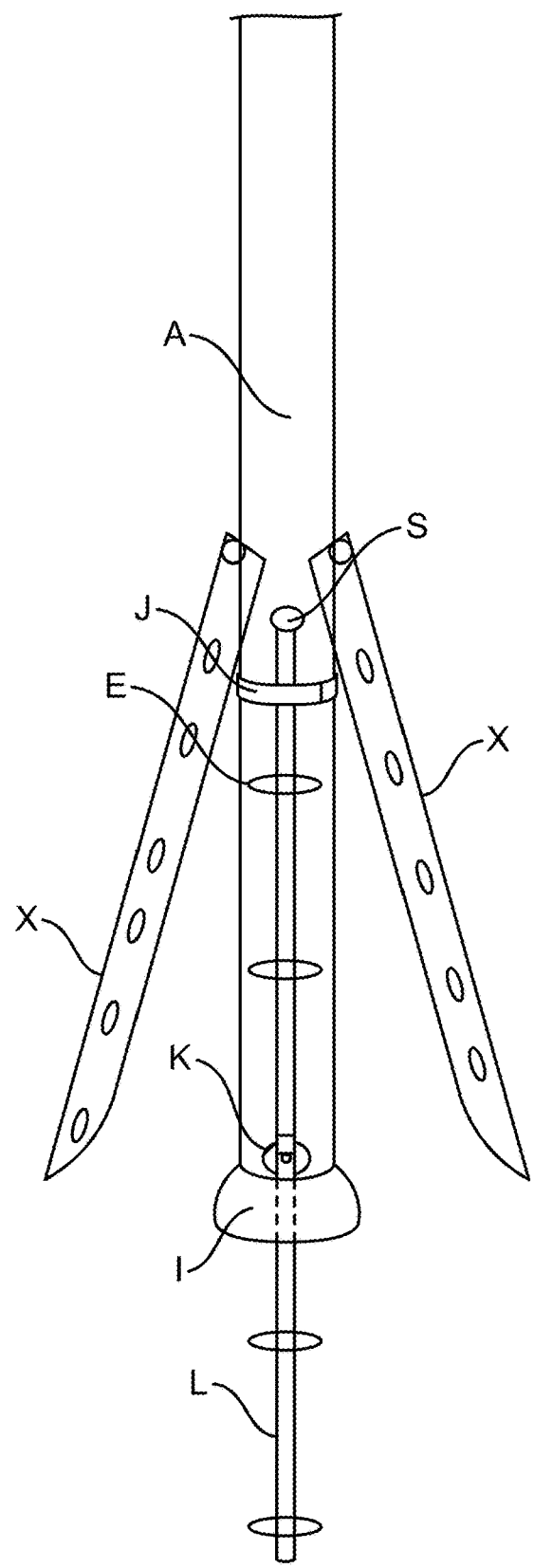
FIG. 2 is a bottom perspective view of the fishing cane and an extended fishing tip in accordance with an embodiment of the present disclosure.

FIG. 2 is a bottom perspective view of the fishing cane with an extended fishing tip in accordance with an embodiment of the present disclosure. The view shows the fishing tip L extended toward the bottom of the fishing cane A adjacent the rubber boot I. The hook and loop strap J helps secure the fishing tip extension to the fishing cane A. The fishing line eyelets E move with and are indeed attached to the fishing line extension L. The fishing line eyelets E pivot on attaching to the fishing line extension and turn and lay flat against the fishing cane in embodiments. Likewise, the bipod legs X are shown extended but store folded up against the fishing cane A. The fishing can acts as a third leg to the bipod legs for stability but the fishing cane at a 45 degree incline from a river bank or a lake beach against the bipod legs enable a fisherman to leave the fishing cane engaged with a hook and line in the water.

Figure 3:
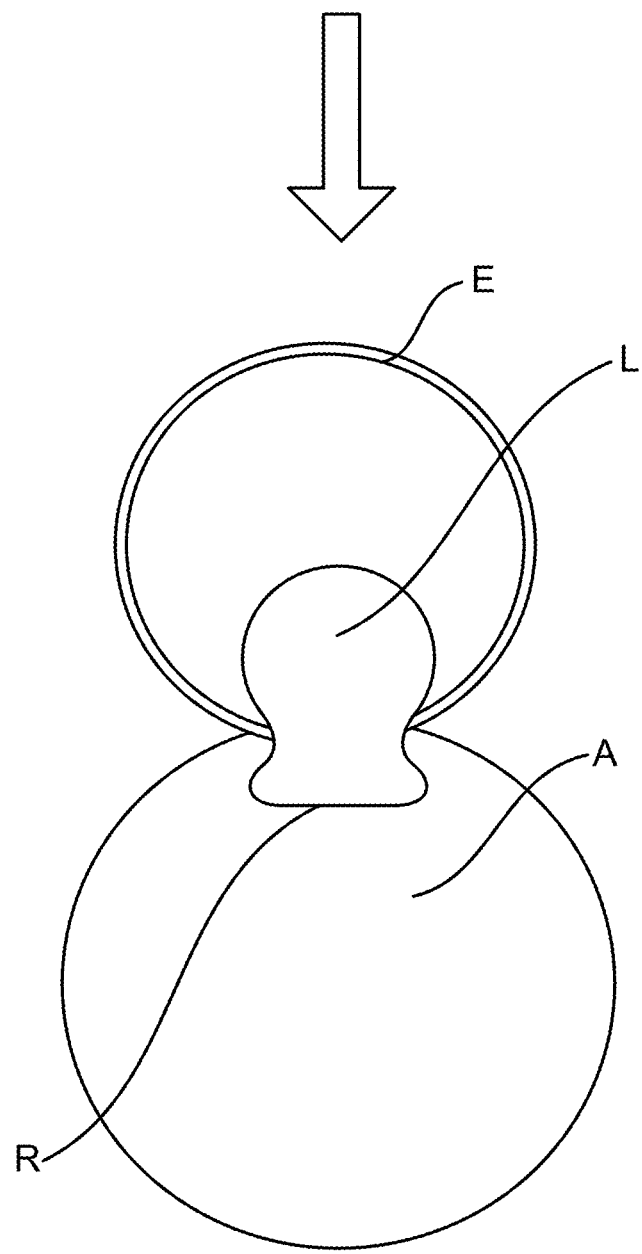
FIG. 3 is a first cross sectional view of the fishing cane in accordance with an embodiment of the present disclosure.

FIG. 3 is a first cross section of the fishing cane in accordance with an embodiment of the present disclosure. The cross section looks down on a bottom portion of the fishing cane A distal the rubber boot I. It shows the embedded and longitudinal keyhole R in the fishing cane A and the fishing line extension L of a complementary shape slidingly received therein. It also shows the fishing line eyelets E attached to the fishing line extension L. The rubber boot I, the crook handle M, the adjustment knobs F, the pivoting arm/leg H and the boss stop S are omitted for sake of clarification.

Figure 4:
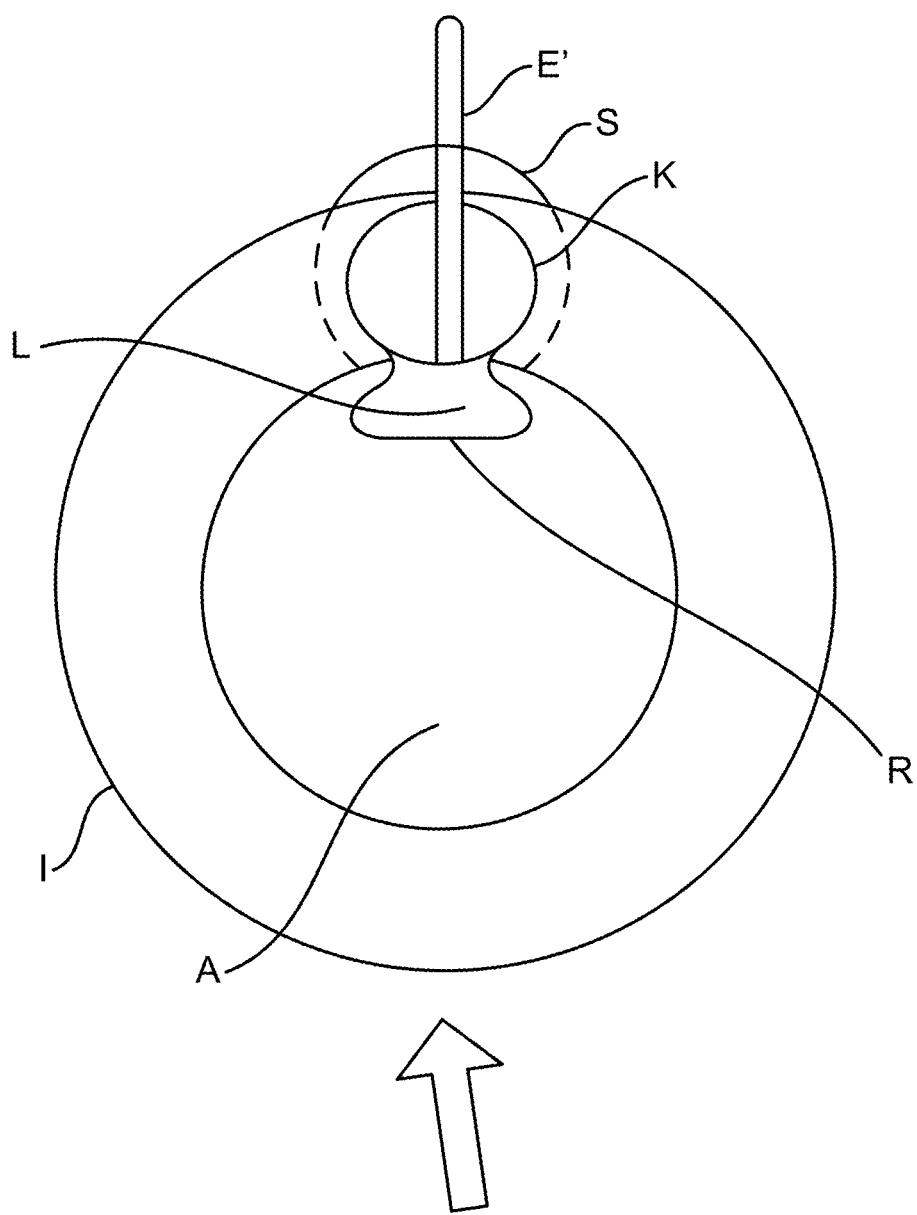
FIG. 4 is a second cross sectional view of the fishing cane in accordance with an embodiment of the present disclosure.

FIG. 4 is a second cross section of the fishing cane in accordance with an embodiment of the present disclosure. The present and second cross sectional view is looking upward onto the bottom end of the fishing cane A. It shows a rotated fishing line eyelet E to allow the fishing line extension L to extend beyond the rubber boot bottom I which has a slit in it to allow the extension to pass. The view also shows the embedded and longitudinal keyhole R and the pivoting barrel P which stops the boss stop S of the fishing line extension L to move past the bottom end of the fishing cane A.

The main purpose of the Outdoor Adventure Fishing Cane is to provide users with a dual-functionality cane that operates as both a walking aid and a fishing rod. For those who have difficulty walking, but are passionate about fishing, packing and carrying both a cane and formal fishing supplies can be a tedious and challenging task. Currently, within the market, there lacks an option that helps to simplify access to fishing necessities for a targeted older sportsperson who is still very much an enthusiast about fishing. Ingenious and practical, the Outdoor Adventure Fishing Cane offers a modern accessory that eliminates the need for packing a separate fishing pole, allowing individuals to seamlessly switch between having a walking support device and a fishing rod.

Expanding on the initial design of an average cane, the Outdoor Adventure Fishing Cane introduces a novel alternative that is integrated with fishing reel and eyelets, providing a hassle-free solution for those who have difficulty walking but seek to go on spontaneous fishing adventures. To use, once one arrives at a fishing location they can remove the protective covering on the cane, put a lure on, and get to fishing. If the user elects to set the cane down, they can prop the leg out, rest it, and take a break. This innovative, top-quality product allows users to enjoy the freedom of using their cane as a walking aid while also having the luxury of altering that same device to meet the benefit of casting abilities. As a result, the Outdoor Adventure Fishing Cane may prove to be essential in the sport/fitness industry.

The Outdoor Adventure Fishing Cane is the only product of its kind that allows users to seamlessly switch between using a walking support device and having that same device be used as a fishing pole, based on a user's preference. This unprecedented product is uniquely designed for the elderly, allowing them to easily manage walking aids and fishing gear, for specific outdoor activities. Moreover, the Outdoor Adventure Fishing Cane is carefully crafted with durable, high-quality materials, is wrapped in a vinyl covering offering an assortment of colors, and is intended to help preserve a sense of autonomy for aging fishermen.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A fishing pole comprising:
   a telescoping cane comprising a rubber foot bottom and a top and fishing line eyelets there between;
   a fishing reel attached proximal to the top of the telescoping cane; and
   a fishing pole extension slidingly embedded in the telescoping cane via a longitudinal keyhole in a surface of the telescoping cane and comprising fishing line eyelets and a stop boss.

2. The fishing pole of claim 1, further comprising a kick stand pivotally mounted proximal the rubber foot bottom and configured to stand the fishing pole.

3. The fishing pole of claim 2, further comprising a hook and loop wrap configured to secure the kick stand against the telescoping cane.

4. The fishing pole of claim 1, further comprising a bipod pivotally mounted distal the rubber foot bottom and configured one hundred and twenty degrees between legs to lean the fishing pole into a standing position.

5. The fishing pole of claim 4, further comprising a hook and a loop wrap configured to secure the bipod legs against the telescoping cane.

6. The fishing pole of claim 1, further comprising a crook replaceably attached to the top of the telescoping cane.

7. The fishing pole of claim 1, wherein the fishing line eyelets are designed to fold against the telescoping cane based on a cane use.

8. The fishing pole of claim 1, wherein the fishing line eyelets are designed to rotate at a point of attachment to the telescoping cane and to the fishing pole extension.

9. The fishing pole of claim 1, further comprising a replaceable cover made to fit a form factor of the fishing reel, the fishing pole extension and the respective fishing line eyelets.

10. The fishing pole of claim 1, wherein the fishing pole extension slides out adjacent the rubber foot bottom.

11. The fishing pole of claim 1, further comprising a pivoting barrel disposed adjacent the rubber foot bottom and configured to catch the stop boss.

12. The fishing pole of claim 11, wherein the pivoting barrel enables the fishing pole extension to pivot with the telescoping cane on the stop boss.

13. The fishing pole of claim 1, further comprising telescoping catch knobs in a first cane portion configured to correspond with catch holes defined in a second cane portion.

14. The fishing pole of claim 1, further comprising a replaceable nylon cover configured to receive the fishing pole from the top to the bottom.

* * * * *